DECIMAL NUMBER TO LOG ANALOGUE CONVERSION

Filed Nov. 28, 1962 3 Sheets-Sheet 1

INVENTORS:
JOE F. KUMM
BY JOHN R. SCHAUERMAN
Arthur L. Bowers
AGENT.

INVENTOR.
JOE F. KUMM
JOHN R. SCHAUERMAN
BY
Arthur L. Bowers
AGENT

DECIMAL NUMBER TO LOG ANALOGUE CONVERSION

Filed Nov. 28, 1962 3 Sheets-Sheet 3

INVENTORS:
JOE F. KUMM
JOHN R. SCHAUERMAN
BY
Arthur L. Bowers
AGENT

United States Patent Office 3,299,419

Patented Jan. 17, 1967

3,299,419

DECIMAL NUMBER TO LOG ANALOGUE CONVERSION

Joe F. Kumm, Lindenhurst, and John R. Schauerman, Huntington, N.Y., assignors, by mesne assignments, to the United States of America as represented by the Secretary of the Navy Filed Nov. 28, 1962, Ser. No. 240,765

8 Claims. (Cl. 340—347)

This invention relates to methods and circuits for providing the logarithm of a decimal number to any desired base and more particularly to circuits of this type for performing the decimal number-to-logarithm conversion to any desired accuracy and in a much shorter time than by any previously known method. Also, this invention relates to conversion of a parallel binary word equivalent of a decimal number into the logarithm of the number to any desired base.

It is sometimes required that numerical information be presented logarithmically to encompass a very broad numerical range. The information may be displayed or registered as a line on a cathode ray tube alongside a series of calibration markings, as a voltage amplitude on a meter or recorder, or by other conventional methods.

An object of this invention is to provide a faster acting, reliable, simpler, more practical, and generally superior method and apparatus for decimal number to log-analogue conversion to any desired degree of accuracy.

A further object is to provide a faster acting, reliable, simpler, more practical and generally superior method and apparatus for log-analogue conversion of the binary word equivalent of a decimal number.

Other objects and advantages will appear from the following description of an example of the invention, and the novel features will be particularly pointed out in the appended claims.

Figures 1, 3:
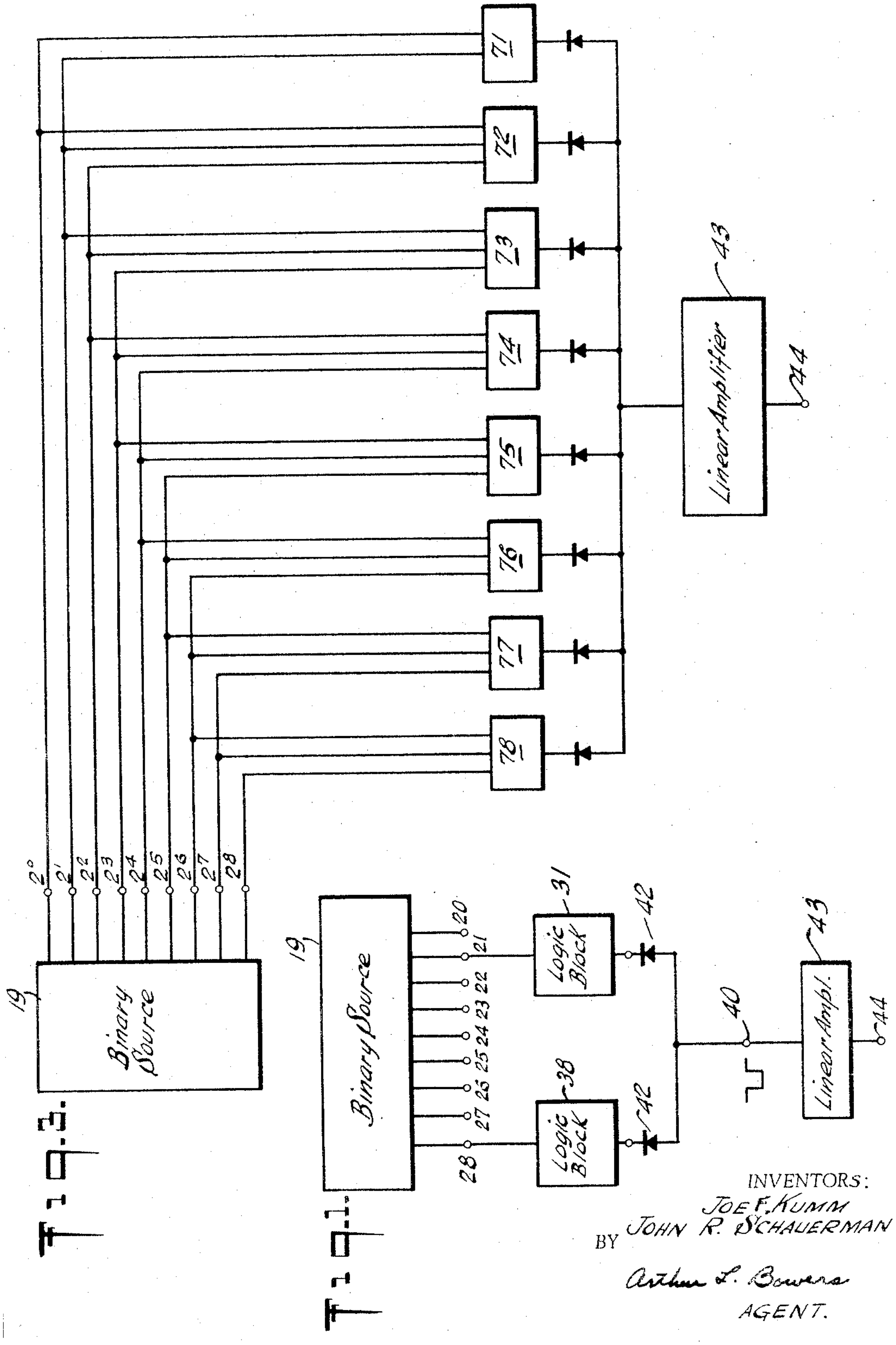
Figure 2:
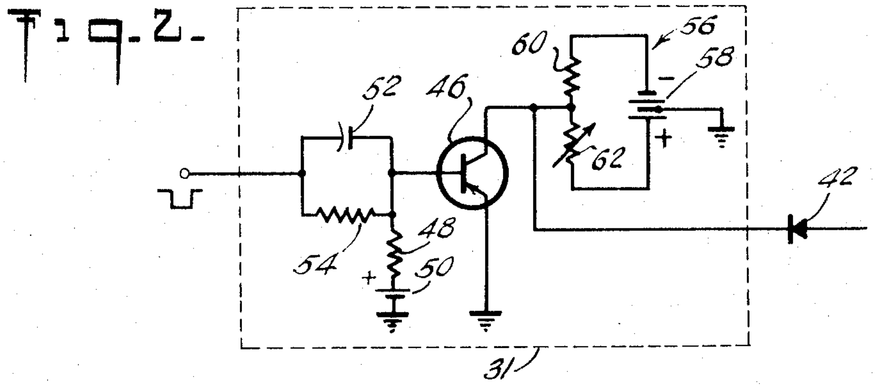
Figure 4:
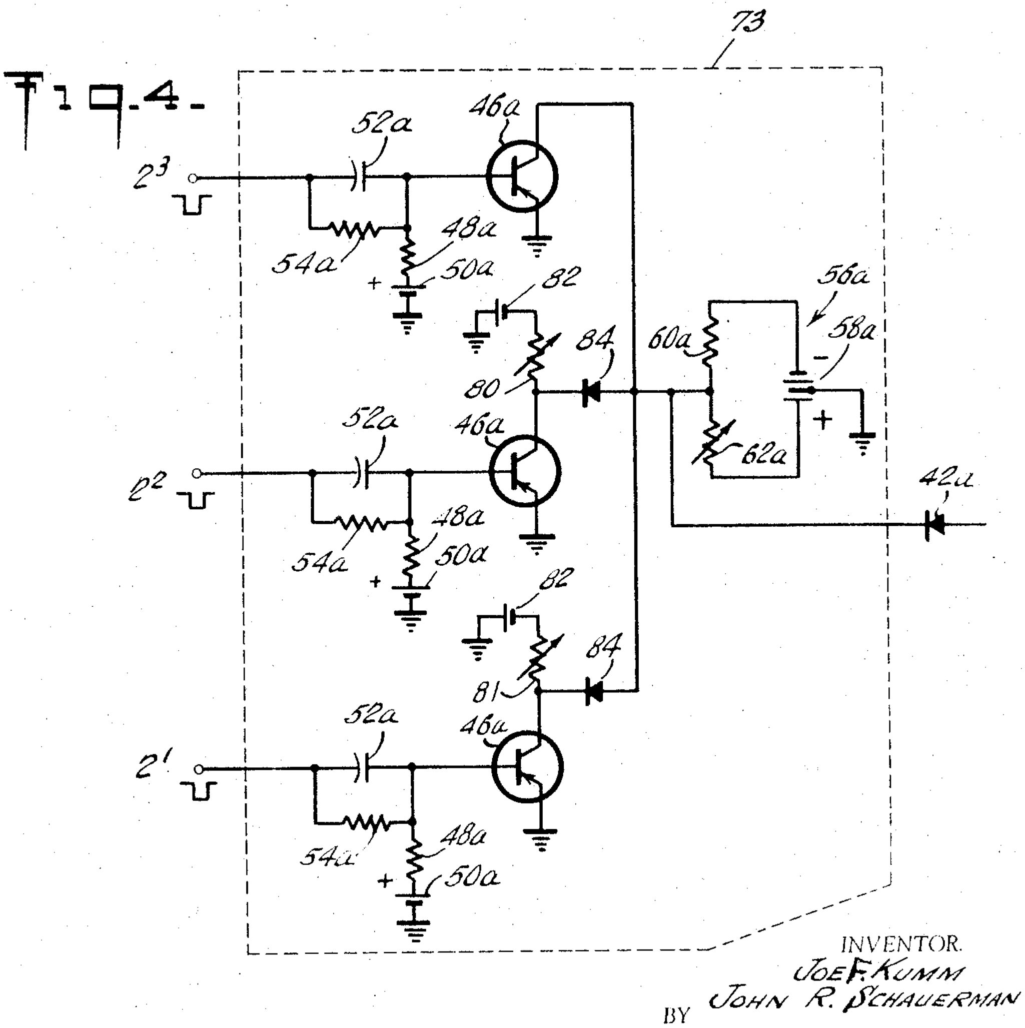
Figure 5:
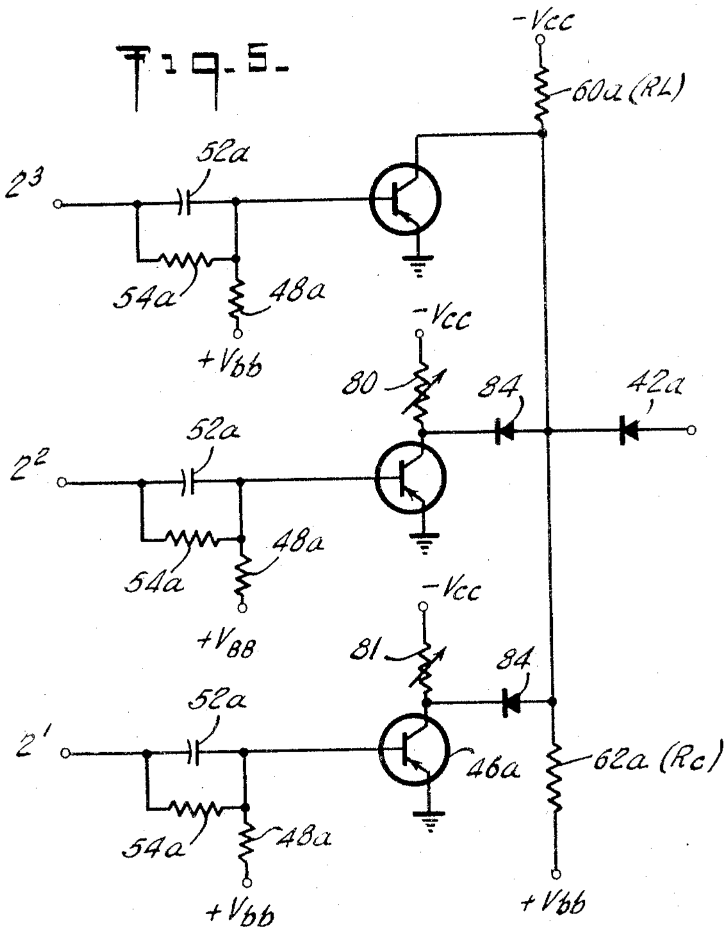
Figure 7:
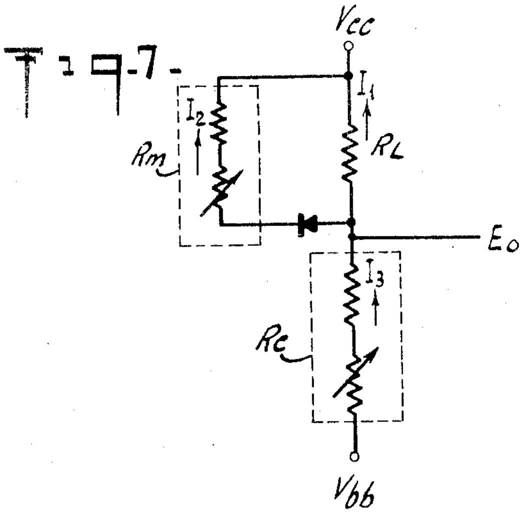
Figure 6:
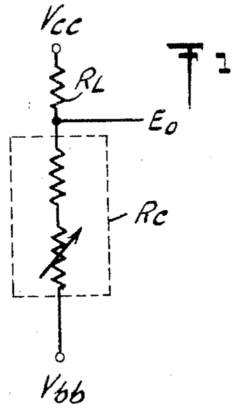

FIG. 1 is a partial block diagram of an embodiment of the invention for providing a coarse approximation of the logarithm of a number, FIG. 2 is a circuit diagram of one of the logic blocks shown in FIG. 1, FIG. 3 is a block diagram of another embodiment of the invention for providing the logarithm of a number more accurately than the embodiment shown in FIG. 1, FIGS. 4 and 5 are circuit diagrams of one of the logic blocks shown in FIG. 3, and FIGS. 6 and 7 are equivalent circuit diagrams for use in determining resistor sizes shown in FIGS. 2 and 4.

By definition, the logarithm of a decimal number is the exponent or power to which another number, the base, must be raised to obtain the decimal number. For example, the relationship $2^{3.82}=14$ expressed as a logarithm to the base 2 is $\log_2 14=3.82$. In a logarithm to any base the number to the left of the decimal point is termed the characteristic and the fraction to the right of the characteristic is termed the mantissa. In the example, the characteristic is 3 and the mantissa is .82.

The characteristic of the logarithm to the base 2 of any number is equal to the exponent of the highest ordered binary bit in the binary expression of the number. This is illustrated by the following chart:

| Decimal Number (N) | Binary Equivalent | Characteristic of $\log_2 N$ |
|---|---|---|
| 1 | 00001 | 0 |
| 3 | 00011 | 1 |
| 7 | 00111 | 2 |
| 15 | 01111 | 3 |
| 31 | 11111 | 4 |

Referring to the above chart, the binary expression for the decimal number 1 is $2^0$. Since the exponent of the highest ordered binary bit in the corresponding binary expression is zero, the characteristic of $\log_2 1$ is zero. The binary expression for the number 31 is $2^4$ plus $2^3$ plus $2^2$ plus $2^1$ plus $2^0$. Since the exponent of the highest ordered binary bit in that binary expression is 4, the characteristic of $\log_2 31$ is 4.

The logarithm to the base 2 of a number N can be changed to the logarithm to the base X of the number as follows:

$$\log_x N=\frac{\log_2 N}{\log_2 x}$$

In FIG. 1 there is shown a binary source 19 for providing the binary word equivalent of any decimal number between 1 and 511 inclusive. Decimal numbers to binary converters are conventional in electronic computers employing flip-flops. A keyboard constitutes one common method by which a decimal number is fed to an electronic computer for conversion to its binary equivalent. A signal on any terminal of source 19 represents a particular power of 2. The nine terminals 20–28 of source 19 represent $2^0$, $2^1$, $2^2$, $2^3$, $2^4$, $2^5$, $2^6$, $2^7$, and $2^8$, respectively, which correspond to the decimal numbers 1, 2, 4, 8, 16, 32, 64, 128 and 256. Any number between 1 and 511 is obtainable from the preceding group of numbers by either selecting one of the above numbers or by summing a plurality or all of the preceding numbers. Therefore, the binary source 19 is able to provide a parallel binary word equivalent of any whole number from 1 through 511 by providing one or several coincident identical signal pulses on the respective terminals 20–28. There is no significance in a nine terminal source; the source 19 may have any number of terminals for providing the parallel binary word equivalent of any number between any desired limits.

Two logic blocks 31 and 39 are shown connected to the terminals 21 and 28, respectively, of the binary source 19. Omitted from FIG. 1 are the logic blocks connected to the terminals 22 through 27. All of the logic blocks have one stable operating condition providing a predetermined reference voltage and a transitory operating condition when triggered by a pulse from binary source 19 to provide an output pulse of predetermined amplitude. The amplitude of the pulse output from any of the logic blocks 32–38 is an integral multiple of the amplitude of the output pulse from logic block 31. If the amplitude of the output pulse of logic block 31 is one volt, the amplitudes of pulses from the logic blocks 32 through 38 are equal to 2 through 8 volts, respectively.

Between the circuit output terminal 40 and the output terminals of all the logic blocks, there are connected rectifiers 42 serving as "or" gates for coupling to the circuit output terminal 40 the voltage from that logic block connected to that terminal of binary source 19 corresponding to the highest ordered binary bit in a parallel binary word. For example, the decimal number 14 would appear as inputs on terminals 23, 22, and 21, corresponding to the binary bits $2^3$, $2^2$, and $2^1$, respectively. The characteristic of the logarithm to the base 2 of 14 is 3, the exponent of the highest ordered binary bit in the binary word for 14. In that case, the voltage from the logic block connected to terminal 23 would appear at terminal 40. In FIG. 1, the outputs from binary source 19 and from the logic blocks are negative. For positive output the diodes are reversed. No logic block is connected to terminal 20. For every decimal number less than 2, there is no output.

For some purposes, a coarse approximation of the logarithm i.e., characteristic only, no mantissa, is sufficient. If the voltage output of each of the logic blocks, equal numerically to the respective binary exponent, is multiplied by a constant equal to $1/\log_2 10$ or if the output at terminal 40 is passed through a linear amplifier 42 to change the voltage at terminal 40 by a factor equal to $1/\log_2 10$, the resultant voltage amplitude appearing at terminal 44 is a good approximation of the common logarithm of the decimal number corresponding to the parallel binary word output of binary source 19.

In FIG. 2, there is shown one embodiment of a fast acting logic block suitable for use in the circuit shown in FIG. 1. It includes a PNP transistor 46 wherein the emitter is connected to a source of reference voltage, e.g. ground. The base is connected to a bias resistor 48 in series with a source of positive bias 50 and to a pulse input circuit including parallel connected capacitor 52 and current limiting resistor 54. The collector is connected to a direct current resistive voltage divider circuit 56 which includes a direct current source 58 having a grounded terminal and terminals to provide positive and negative potentials relative to ground. A fixed resistor 60 and a variable resistor 62 are connected in series across the direct current source 58. In the absence of a negative input pulse, the transistor is in a fully conductive stable state of operation and the output potential of the logic block is at a fraction of a volt below ground equal to the voltage drop in the transistor at saturation. When the logic block is pulsed, the current flow through the transistor is cut off. By choice of positive and negative voltages of direct current source 58, resistors 60 and 62, and by adjustment of variable resistor 62, the voltage output pulse of logic block 31, when triggered, is made proportional to or equal to the voltage corresponding to the exponent of the respective binary bit. Alternatively, the amplitude of the output pulse is numerically equal to the product of the exponent of the respective binary bit and a constant, e.g., $1/\log_2 10$, discussed in the preceding paragraph, to provide a coarse approximation of $\log_{10}$ of a decimal number.

Two regulated direct current power supplies suffice for all the logic blocks. The bias sources 50 and the positive potential portions of direct current supplies 58 may be one power supply, and the negative potential portion of direct current supply 58 may be the other power supply of higher terminal voltage. The latter should be as high as practical to approach a constant current source, but at least twice the maximum output voltage from the highest ordered logic block.

In FIGS. 1 and 2, the logic blocks provide negative outputs. Alternatively, the logic blocks may provide positive outputs by substituting an NPN transistor for the PNP transistor, reversing rectifiers 42 and 84, and reversing the polarities of the supply voltages.

In the embodiment shown in FIG. 3, each logic block is connected to more than one terminal of the binary source for providing an output voltage corresponding to the characteristic plus an approximation of the mantissa. The accuracy in the mantissa is related to the number of successive lower ordered output terminals of the binary source sampled by each logic block.

The circuit includes a binary source 19 having nine output terminals $2^0$, $2^1$, $2^2$, $2^3$, $2^4$, $2^5$, $2^6$, $2^7$, and $2^8$ for a nine bit binary word as in FIG. 1. Eight logic blocks 71 through 78 are connected to binary source 19; logic block 71 is connected to two terminals for sampling the single bit adjacent to $2^1$ and logic blocks 72 through 78 are connected to three terminals for double adjacent bit sampling as follows:

| | |
|---|---|
| **71** | $2^1$ and $2^0$ |
| **72** | $2^2$ and $2^1$ and $2^0$ |
| **73** | $2^3$ and $2^2$ and $2^1$ |
| **74** | $2^4$ and $2^3$ and $2^2$ |
| **75** | $2^5$ and $2^4$ and $2^3$ |
| **76** | $2^6$ and $2^5$ and $2^4$ |
| **77** | $2^7$ and $2^6$ and $2^5$ |
| **78** | $2^8$ and $2^7$ and $2^6$ |

The logic blocks 73 taken as illustrative is shown in FIG. 4. Elements corresponding to those in FIG. 2 are followed by lower case letter *a*. The logic block 73 includes three branches for sampling three successively ordered terminals $2^3$, $2^2$, and $2^1$, termed double adjacent bit sampling. The branch connected to the terminal $2^3$ and including transistor **46*a* with grounded emitter, parallel connected capacitor 52*a* and resistor 54*a* coupling the transistor base to the binary source terminal $2^3$, series connected bias resistor 48*a* and bias source 50*a* between the transistor base and ground and the direct current voltage divider circuit 56*a* corresponds element for element to those in FIG. 2. Each of other branches connected to the successively lower ordered terminals $2^2$ and $2^1$ include substantially identical transistors 46*a* and substantially identical input elements 52*a*, 54*a*, since the pulses on all terminals of the binary source are identical and substantially identical bias resistor 48*a* and bias source 50*a*. Whereas the collector of the transistor in the branch connected to the highest ordered of the three terminals is connected directly to the junction of the voltage divider resistors 60*a* and 62*a*, the collector circuit of the transistors in each of the branches connected to the lower ordered terminals $2^2$ and $2^1$ include a variable resistor 80 and a negative direct current source 82 connected between collector and ground. A diode 84 is connected between the junction of resistors 60*a* and 62*a*** and the collector of each of the two lower ordered branches.

In the absence of any signal at terminals $2^1$, $2^2$, and $2^3$, all three transistors are conducting and the output voltage is at ground. Only if a signal pulse appears at binary source terminal $2^3$ will the logic block function. If no signal appears at binary terminal $2^3$, the voltage at the output terminal remains unchanged regardless of any signals appearing at one or both of the lower order terminals $2^2$ and $2^1$. When a pulse appears at terminal $2^3$ only, the transistor in the branch connected to terminal $2^3$ is cut off and the output voltage of the logic block drops to a voltage below ground determined by the parameters of the direct current voltage divider circuit. For scaled output, the voltage divider circuit **56*a*** is set to provide in response to a $2^3$ bit an output voltage pulse equal to —3 volts. When coincident signals appear on terminal $2^3$ and one or both terminals $2^1$ and $2^2$, the amplitude of the output pulse is between —3 volts and —4 volts. Coincident signals on terminals $2^3$ and $2^2$ correspond to decimal number 12. Since $\log_2 12$ is 3.58, the parameters of the collector circuit in the branch connected to terminal $2^2$ may be selected and adjusted for an incremental voltage equal to —0.58 volt. Coincident signals on terminals $2^3$ and $2^1$ correspond to decimal number 10. Since $\log_2 10$ is 3.32, the parameters in the branch circuit connected to terminal $2^1$ may be selected for an incremental voltage of —0.32. Coincident signals on terminals $2^3$, $2^2$, and $2^1$ correspond to decimal number 14. In this case, the incremental voltage is less than the sum of the separate incremental voltages provided by the branches connected to terminal $2^1$ and $2^2$ being the result of paralleling the collector circuits in the two lower ordered branches. Since $\log_2 14$ is 3.81 and not 3.90, the resultant output when all three terminals are pulsed is substantially equal to the actual logarithm. The table below illustrates with decimal numbers 8 through 13 the degree of accuracy that can be obtained with double adjacent bit sampling as in the circuit in FIG. 3.

| Decimal Number | Equivalent Binary Word | Actual $\log_2$ | Converter $\log_2$ | Percent Error |
|---|---|---|---|---|
| 8 | 1000 | 3.00 | 3.00 | 0 |
| 9 | 1001 | 3.17 | 3.00 | −5.36 |
| 10 | 1010 | 3.32 | 3.32 | 0 |
| 11 | 1011 | 3.46 | 3.32 | −4.04 |
| 12 | 1100 | 3.58 | 3.58 | 0 |
| 13 | 1101 | 3.70 | 3.58 | −3.34 |
| 14 | 1110 | 3.81 | 3.81 | 0 |
| 15 | 1111 | 3.91 | 3.81 | −2.31 |

With quadruple adjacent bit sampling, the percentage error, following the above principles is less than one percent. The amount of sampling is a function of the accuracy desired. The maximum error occurs when all the sampled bits are in the zero state and all the bits lower ordered than those sampled are in the 1 state. Since the maximum error occurs when all the sampled bits are in the 0 state, an alternative circuit arrangement may include simple, conventional analogue summing circuits for determining the mantissa. For example, with double adjacent bit sampling, if an output of 0.52 is made available for an input on the binary terminal immediately adjacent to the highest ordered input, instead of 0.58, and an output of 0.31 is made available for the next lower binary terminal, in the presence of both inputs, a conventional summing network will provide an additive output of 0.83. The order of accuracy obtainable with this circuit arrangement is substantially the same as obtained with the illustrated circuit.

Transistor circuit literature useful in design of circuits as in FIGS. 2 and 4 is extensive. Two references we suggest for this purpose are Transistors Handbook by Bevitt, published by Prentice-Hall, copyright 1956, and Semiconductor Electronics by Hunter, published by McGraw-Hill.

In the embodiment shown in FIGS. 3 and 4 as in the embodiment shown in FIGS. 1 and 2, only two regulated direct current supplies are needed; alternatively one supply providing two regulated terminal voltages may be used. The positive bias voltage provided at **50*a* and the positive voltage of direct current supply 58*a* may be identical and the negative voltage provided at 82 and the negative voltage of direct current supply 58*a*** may be identical. FIG. 5 corresponds to FIG. 4 showing $V_{bb}$ as the positive voltage and $V_{cc}$ as the negative voltage. The negative voltage should be equal to at least twice the maximum signal voltage output.

In designing a circuit as in FIG. 5, a first step is to select the type of transistor. Preferably, the transistors in all the logic blocks are identical. Where the circuit is to operate in a wide range of environmental conditions, and reliability and high speed are emphasized silicon transistors are favored. If the circuit is to operate under controlled environmental conditions or where the cost is to be held down and the operating conditions will afford opportunity for repair and replacement, germanium transistors are favored. Germanium PNP transistors are assumed for purposes of this explanation. The maximum collector voltage and maximum power dissipation must then be considered. The collector voltage rating should be at least twice the highest actual output voltage for the circuit. If the circuit provides scaled output, the highest voltage output will be substantially equal to the exponent of the highest ordered binary bit plus one. In this type of circuit, experience suggests that power dissipation in each transistor be no higher than 250 milliwatts. If germanium PNP transistors are used, the voltage drop in the transistor when fully conductive is approximately 0.5 volt. This corresponds to 500 milliamperes maximum. Actually, a transistor having saturation collector current far less than that, i.e., equal to about 10 milliamperes is satisfactory for this circuit.

The resistance of resistor **60*a* is identical for all logic blocks. The lower limit for the resistance of resistor 60*a* is governed by the maximum safe collector current of the selected transistor and the upper limit of the resistance for resistor 60*a* is governed by the loading of succeeding stages, not shown, connected to the output of the logic blocks. Assuming $V_{cc}$ equal to −24 volts, the resistance of resistor 60*a*** may be 2200 ohms (2.2K) for transistor wherein saturation collector current is 10 milliamperes.

Then the resistor **62*a*** for each logic block is determined for providing the characteristic voltage. Referring to FIG. 6:

$$R_c=\frac{(V_{bb}+E_o)R_L}{V_{cc}-E_o}$$

For characteristic voltage of −9 volts $$R_L=2.2\text{K}$$
$$V_{bb}=+12\text{ volts}$$
$$V_{cc}=-24\text{ volts}$$

$$R_c=\frac{(12+9)(2200)}{24-9}=3.08\text{K}$$

Therefore $R_c$=2.7K+500 ohm potentiometer for a range of 2.7K to 3.2K.

The resistors 80 and 81 determining the mantissa voltages are calculated from the equivalent circuit in FIG. 7 as follows:

$$I_3=I_1+I_2$$

$$I_3=\frac{E_o+V_{bb}}{R_c}$$

$$I_1=\frac{V_{cc}-E_o}{R_L}$$

$$I_2=\frac{V_c-E_o-V_d}{R_m}$$

Therefore $$R_m=\frac{V_{cc}-E_o-V_d}{\frac{E_o+V_{bb}}{R_c}-\frac{V_{cc}-E_o}{R_L}}$$

where $V_d$ is the forward voltage drop in diode 84.

$R_L$, $V_{bb}$, and $V_{cc}$ are the same for all logic blocks.

$R_c$ is calculated for the correct characteristic voltages from the respective logic blocks. Each of the two $R_m$'s for each logic block is determined separately from the above equation for the total $\log_2$ (characteristic plus mantissa for a binary "1" state in each of the two branches adjacent the characteristic or highest ordered branch. No calculation is necessary for a binary "1" state in all three branches of the logic block; the resultant $R_m$ when the two $R_m$'s are in parallel provides an output substantially equal to the actual logarithm to the base 2.

Example:

$$E_o=-9.58\text{ volts}$$
$$V_{bb}=+12\text{ volts}$$
$$V_{cc}=-24\text{ volts}$$
$$R_L=2.2\text{K}$$
$$R_c=3.08\text{K}$$
$$V_d=0.5\text{ for germanium diode.}$$

Substituting in the preceding equation:

$$R_m=\frac{24-9.58-0.5}{\frac{9.58+12}{3.08\text{K}}-\frac{24-9.58}{2.2\text{K}}}$$

$R_m$=30K+2.5K potentiometer for range of 30K to 32.5K.

To determine resistors 48$a$ and 54$a$ which are the same for all the circuit branches since the conditions at all input terminals are the same, the relationship between resistors 48$a$ and 54$a$ are considered separately for the on and off conditions. In the off condition, i.e., when a negative pulse arrives and the transistor is cut off, one condition to be satisfied is that the reverse voltage on the base of the transistor does not exceed manufacturer's recommendations. Therefore, in the off condition, the voltage across resistor 54$a$ is equal to the sum of the voltage at the input terminal plus one half the maximum allowable reverse base voltage. The voltage across the resistors 48$a$ and 54$a$ in series is equal to the sum of the bias voltage plus the voltage at the input terminal. Since the voltages are known, the relationship of resistors 48$a$ and 54$a$ are obtained as follows:

$$\frac{R_{54a}}{R_{48a}+R_{54a}}=\frac{V_{\text{input}}+V_{\text{base}}}{V_{\text{input}}+V_{\text{bb}}}$$

In the on condition, in a germanium PNP transistor, the base voltage is about 0.7 volt negative relative to the emitter, and the base current is equal to the collector current divided by the current gain of the transistor.

$$R_{54a}=\frac{V_{54a}}{I_{54a}}$$

The voltage $V_{54a}$ is equal to the difference of the voltage at the input terminal when there is no input pulse and the base voltage. The current $I_{54a}$ through the resistor $R_{54a}$ is equal to the base current plus the current through the bias resistor. The base current is known; the current through the bias resistor is equal to the difference between the bias voltage and the base voltage divided by the bias resistor.

The resistors 48$a$ and 54$a$ are determined from two simultaneous equations corresponding to the on and off conditions. The capacitor 52 is a speedup capacitor to reduce switching time as is conventional in pulse circuitry. To select the speedup capacitor, the base to emitter capacitance, and the base to collector capacitance of the transistor, provided on the manufacturer's data sheet, and overshoot are taken into account for steepest practical rise time. Capacitor 52$a$ is the standard value capacitor most nearly satisfying the above conditions.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. Apparatus for converting a decimal number into an approximation of the common logarithm of the number comprising:
   - (A) a decimal number-to-binary converter having binary output terminals corresponding to $2^1$ through $2^n$ respectively, for converting a voltage corresponding to a decimal number into binary form represented by a pulse from one of the output terminals or coincident pulses from more than one of the output terminals,
   - (B) $n$ direct voltage circuits each having a binary input terminal,
     - (a) each circuit being connected to a respective binary output terminal of said number-to-binary converter,
     - (b) each circuit having a stable operating state and a transitory operating state when triggered by an input pulse from said decimal number to binary converter,
     - (c) said circuits when in the stable operating state providing identical output reference voltages,
     - (d) each circuit being in the transitory operating state only when triggered by an output pulse from the respective binary terminal,
     - (e) each circuit when in the transitory operating state providing a predetermined output voltage differing from the reference voltage by an integral multiple of one volt, the integral multiple corresponding to the binary exponent of the terminal to which the respective circuit is connected,
   - (C) a linear amplifier wherein input and output are in the ratio of $\log_{10} 2$,
   - (D) means connected to the outputs of said circuits to pass to said linear amplifier only the largest of coincident voltage differentials from said circuits,
   - (E) whereby the output of said differential amplifier in volts is a rough approximation of the common logarithm of the number.

2. Apparatus as defined in claim 1, wherein
   - (F) each circuit includes an additional input terminal connected to that converter binary output terminal which is the next lower ordered relative the one to which the other input terminal of the circuit is connected,
   - (G) each circuit having a second transitory operating state and being in that state only when both input terminals are triggered by coincident outputs from the respective binary output terminals,
   - (H) each circuit when in the second transitory operating state providing a predetermined output voltage differing from the reference voltage by a predetermined voltage numerically between the binary exponent corresponding to the higher ordered binary terminal to which said circuit is connected and the succeeding higher ordered exponent.

3. Apparatus for obtaining a close approximation of $\log_x N$ from a decimal number N comprising:
   - (A) means for converting a decimal number N into a pattern of binary-bit pulses corresponding to the bits of the binary expression for the number N,
   - (B) means responsive solely to the binary-bit pulses to provide a voltage amplitude having predetermined proportional relationship to the sum of the exponent of the highest ordered binary bit of the binary expression of the number N plus the mantissa of the $\log_2$ of a number corresponding to said highest ordered binary bit and a predetermined number of successive lower ordered binary bits of said binary expression,
   - (C) and amplifier means for multiplying the last-mentioned voltage amplitude by a constant equal to $\log_x 2$ to provide a voltage amplitude corresponding to a close approximation of $\log_x N$.

4. Apparatus for obtaining the common logarithm of a number comprising:
   - (A) means for converting the number into a pulse pattern corresponding to the binary expression of the number,
   - (B) means responsive solely to the pulse pattern to provide a voltage amplitude corresponding numerically to the logarithm to the base 2 of the number, and
   - (C) amplifier means for multiplying the last mentioned voltage amplitude by a constant equal to $\log_{10} 2$ to provide a voltage amplitude corresponding numerically to the common logarithm of the number.

5. Apparatus for obtaining $\log_x N$ from a number N comprising:
   - (A) means for converting the number N into a pulse pattern corresponding to the binary expression of the number,
   - (B) means responsive solely to the pulse pattern to provide a voltage amplitude corresponding numerically to the approximate logarithm to the base 2 of the number, and
   - (C) amplifier means for multiplying the last mentioned voltage amplitude by a constant equal to $\log_x 2$ to provide a voltage amplitude corresponding to $\log_x N$.

6. A direct binary to log analog converter for converting a parallel plural bit binary word represented by one or more pulses into its approximate logarithm equivalent comprising:

(A) a plurality of independent circuits, each having a binary bit input terminal, (a) each circuit having a stable operating state and a transitory operating state in response solely to an input pulse corresponding to one of the bits, (b) said circuits when in stable operating state providing identical output reference voltages, (c) each circuit when in the transitory operating state providing a predetermined output voltage differing from the reference voltage by an integral multiple of one volt, the integral multiple corresponding to the binary exponent of the terminal to which the respective circuit is connected, (B) a common output terminal for all of said circuits, and (C) a diode for each of said circuits and connected between the output terminals of the respective circuits and the common output terminal, to couple to said common output terminal only the largest of coincident output voltages of said circuits.

7. A converter as in claim 6, further comprising:

(D) means for multiplying the output voltage at said common output terminal by a factor of $\log_x 2$ to provide the approximate logarithm equivalent of the binary word to base *x*.

8. A converter as in claim 6, wherein (E) each circuit includes an additional input terminal for the next lower ordered bit relative to the one to which the other input terminal corresponds, (F) each circuit having a second transitory operating state and being in that state only in response to coincident inputs to both input terminals, (G) each circuit when in the second transitory operating state providing a predetermined output voltage differing from the reference voltage by a predetermined voltage numerically between the binary exponent corresponding to the higher ordered binary bit terminal and the next higher ordered exponent.

References Cited by the Examiner

UNITED STATES PATENTS

| | | | |
|---|---|---|---|
| 2,970,308 | 1/1961 | Stringfellow et al. | 340—347 |
| 3,214,603 | 10/1965 | Von Urff | 235—197 X |

OTHER REFERENCES

IBM Technical Disclosure Bulletin, vol. 5, No. 5, October 1962, pp. 30–31.

MAYNARD R. WILBUR, *Primary Examiner.*

MALCOLM A. MORRISON, *Examiner.*

K. R. STEVENS, W. J. KOPACZ, *Assistant Examiners.*